United States Patent
Okamoto et al.

(10) Patent No.: US 12,031,858 B2
(45) Date of Patent: Jul. 9, 2024

(54) AERIAL OPTICAL FIBER CABLE INSPECTION METHOD, AERIAL OPTICAL FIBER CABLE INSPECTION DEVICE, AND PROGRAM

(71) Applicant: NIPPON TELEGRAPH AND TELEPHONE CORPORATION, Tokyo (JP)

(72) Inventors: Tatsuya Okamoto, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 433 days.

(21) Appl. No.: 17/429,861

(22) PCT Filed: Jan. 29, 2020

(86) PCT No.: PCT/JP2020/003106
§ 371 (c)(1),
(2) Date: Aug. 10, 2021

(87) PCT Pub. No.: WO2020/166330
PCT Pub. Date: Aug. 20, 2020

(65) Prior Publication Data
US 2022/0107218 A1    Apr. 7, 2022

(30) Foreign Application Priority Data
Feb. 12, 2019 (JP) .................. 2019-022951

(51) Int. Cl.
*G01H 9/00* (2006.01)
*G01M 11/00* (2006.01)
*H04B 10/071* (2013.01)

(52) U.S. Cl.
CPC ............ *G01H 9/004* (2013.01); *G01M 11/30* (2013.01); *H04B 10/071* (2013.01)

(58) Field of Classification Search
USPC .................................................. 73/655, 955
See application file for complete search history.

(56) References Cited

U.S. PATENT DOCUMENTS 7,376,326 B2 * 5/2008 Corbeels ................ G02B 6/483
385/137
2008/0019654 A1    1/2008 Corbeels

FOREIGN PATENT DOCUMENTS

CA    2772897 A1 *  9/2012 ........... G01N 21/952
CN    103925984 A  *  7/2014
(Continued)

OTHER PUBLICATIONS

Atsushi Nobiki, "Research and Development of Optical Transmission Medium Technology", NTT Gizyutu Journal, Feb. 2018, pp. 48-52.
(Continued)

*Primary Examiner* — Clayton E. LaBalle
*Assistant Examiner* — Warren K Fenwick
(74) *Attorney, Agent, or Firm* — Harness, Dickey & Pierce, P.L.C.

(57) ABSTRACT

It is an object of the present invention to provide an aerial optical fiber cable inspection method, an aerial optical fiber cable inspection device, and a program which can identify a cable sagging section from vibration sensing results. In the aerial optical fiber cable inspection method according to the present invention, a vibration distribution waveform along the longitudinal direction of an aerial optical fiber cable measured using an optical fiber vibration sensing device is received as an input, a standard deviation of the amplitude of vibration at each position in the vibration distribution waveform is calculated, and a section with a standard
(Continued)

deviation larger than that of other sections is identified as a cable sagging section.

6 Claims, 5 Drawing Sheets

(56) References Cited

FOREIGN PATENT DOCUMENTS

| CN | 104125010 A | * | 10/2014 |
|----|-------------|---|---------|
| JP | H08240478 A | * | 9/1996 |
| JP | 2011109743 A | | 6/2011 |
| JP | 2012-008645 A | | 1/2012 |
| JP | 2017-026503 A | | 2/2017 |
| JP | 2017-035973 A | | 2/2017 |
| JP | 2017026503 A | * | 2/2017 |

OTHER PUBLICATIONS

Y. Achkire, "Active Tendon Control of Cable-Stayed Bridges", Ph. D. dissertation, Active Structures Laboratory, Universite Libre de Bruxelles, Belgium, 1997.

* cited by examiner

[Fig. 1]
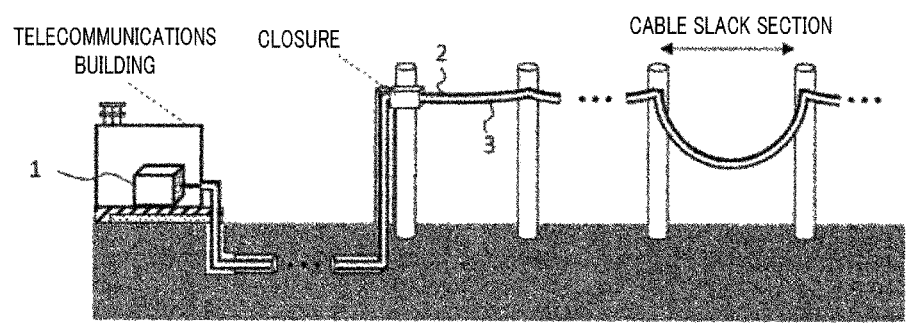

[Fig. 2]
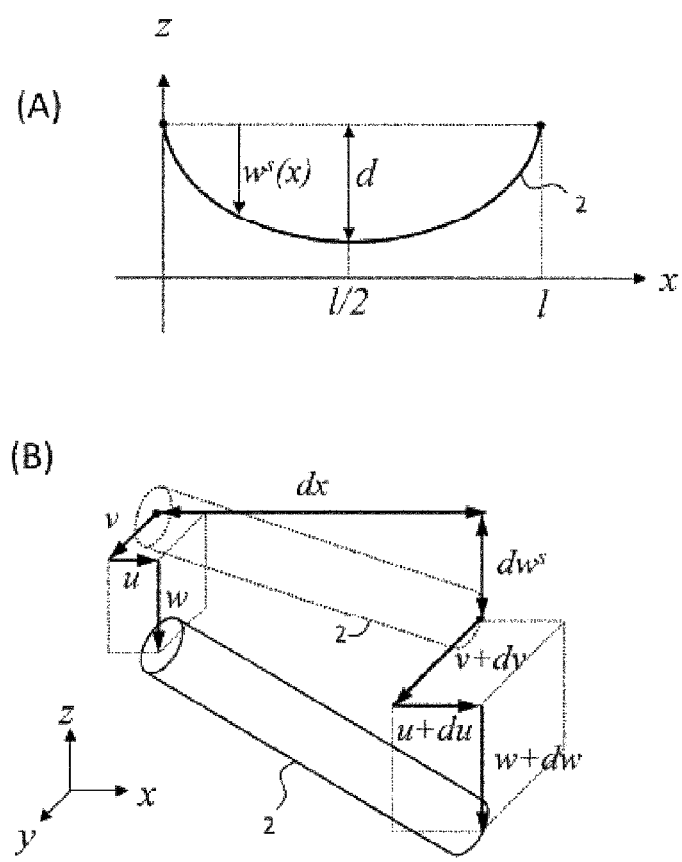

[Fig. 3]
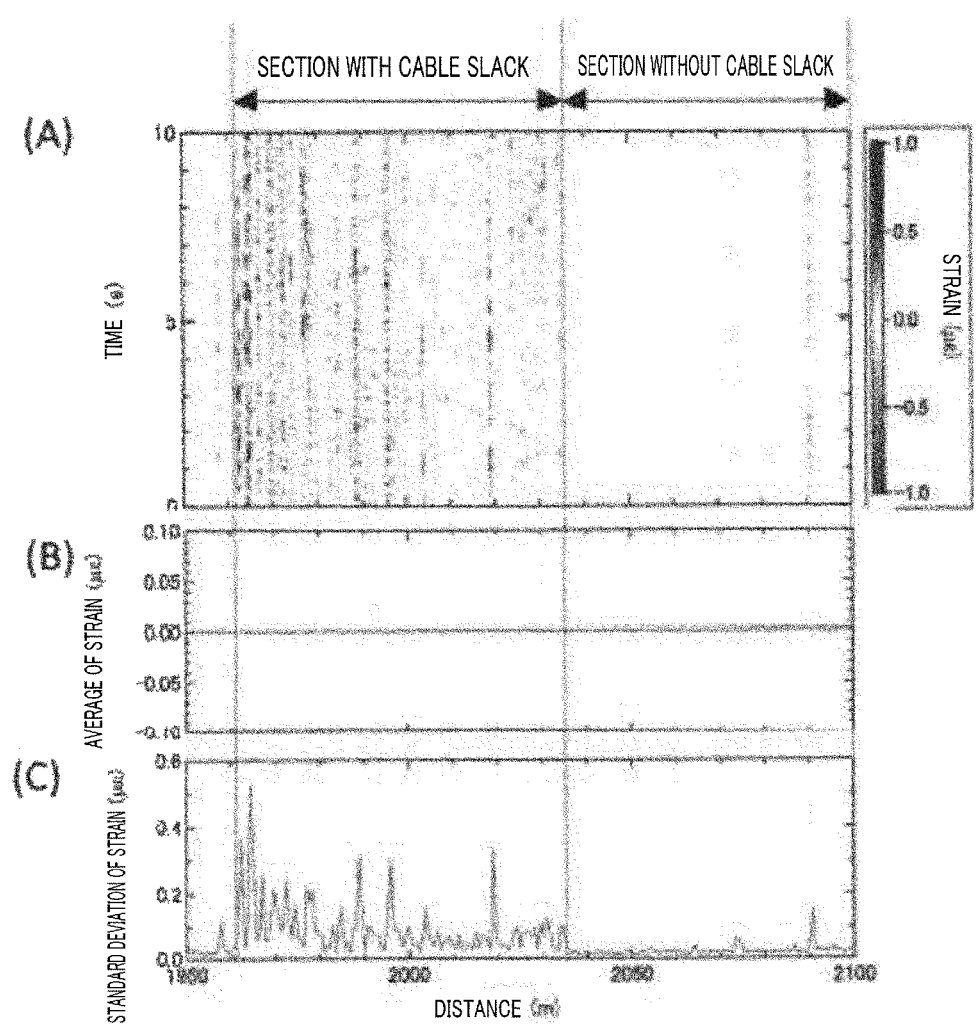

[Fig. 4]
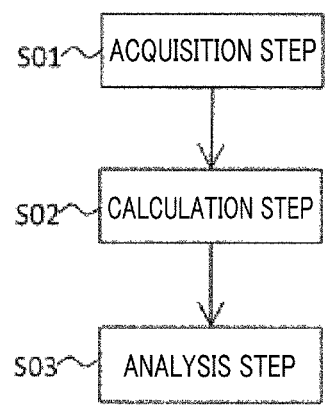

[Fig. 5]
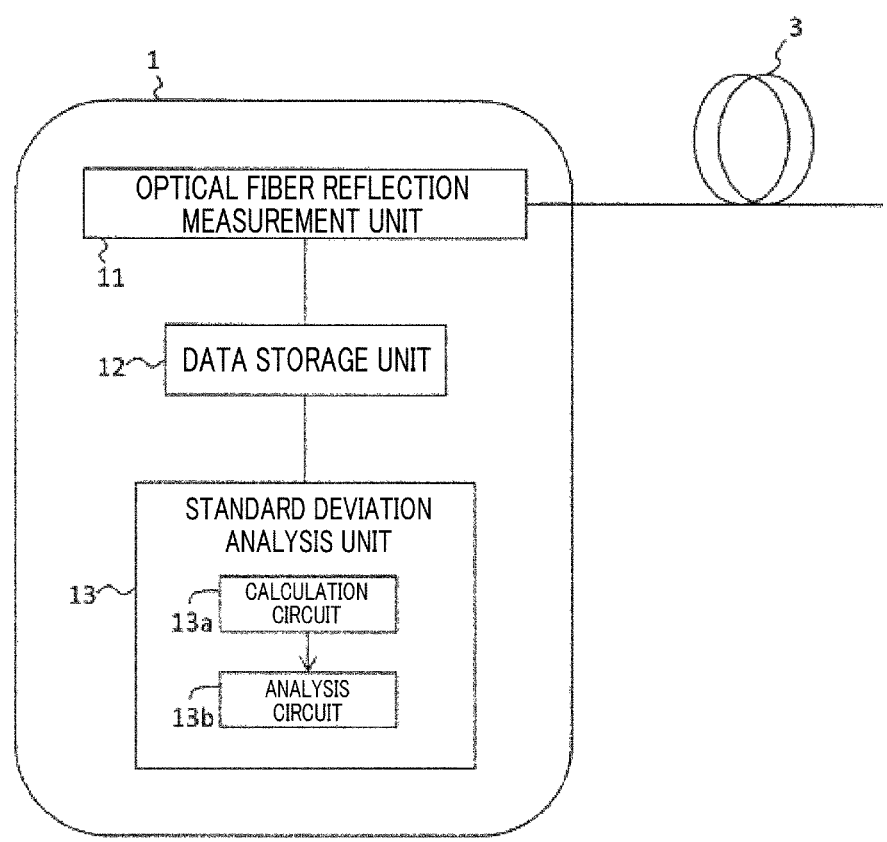

AERIAL OPTICAL FIBER CABLE INSPECTION METHOD, AERIAL OPTICAL FIBER CABLE INSPECTION DEVICE, AND PROGRAM

CROSS-REFERENCE TO RELATED APPLICATIONS

This application is a 371 U.S. National Phase of International Application No. PCT/JP2020/003106 filed on Jan. 29, 2020, which claims priority to Japanese Application No. 2019-022951 filed on Feb. 12, 2019. The entire disclosures of the above applications are incorporated herein by reference.

TECHNICAL FIELD

The disclosure relates to a technique for identifying a sagging section of an aerial optical fiber cable by performing an optical test from a telecommunications building.

BACKGROUND ART

Optical telecommunications carriers inspect for the soundness of telecommunications facilities in order to prevent interruption of telecommunications services. One item for inspection is whether or not there is an aerial cable sagging. Currently, workers go to the site to visually perform the work of inspecting whether or not there is a cable sagging. The description of NPL 1 (hereinafter referred to as related art 1) has been studied to improve the efficiency of the inspection work. NPL 1 reports a concept of determining whether or not there is a cable sagging from a remote location by performing an optical test at a telecommunications building on an optical fiber housed in a cable and measuring vibration caused by a disturbance applied to the optical fiber.

CITATION LIST

Non Patent Literature

[NPL 1] Atsushi Nobiki, "Hikaridensôbaitaigizyutu niokeru Kenkyukaihatu no Dôkô (Research and Development of Optical Transmission Medium Technology)", NTT Gizyutu Journal, pp. 48-52, 2018.
[NPL 2] Y. Achkire, "Active tendon control of cable-stayed briges", Ph. D. dissertation, Active Structures Laboratory, Universite Libre de Bruxelles, Belguim, 1997

SUMMARY OF THE INVENTION

Technical Problem

However, in the related art 1, the relationship between a cable sagging which is a static phenomenon and a vibration which is a dynamic phenomenon has not been clarified and a specific method of identifying a cable sagging section which is a static phenomenon from vibration sensing results has not been settled.

Therefore, it is an object of the present invention to provide an unestablished aerial optical fiber cable inspection method, an aerial optical fiber cable inspection device, and a program which can identify a cable sagging section from vibration sensing results.

Means for Solving the Problem

In order to achieve the object, the aerial optical fiber cable inspection method according to the present invention acquires a vibration distribution along the longitudinal direction of a cable from vibration sensing results and identifies a cable sagging section based on a standard deviation of the amplitude at each point of the vibration distribution.

Specifically, the aerial optical fiber cable inspection method according to the present invention includes an acquisition step of acquiring a vibration distribution along a longitudinal direction of an aerial optical fiber cable, a calculation step of calculating a standard deviation of an amplitude at each position in the vibration distribution, and an analysis step of identifying a cable sagging section in which the aerial optical fiber cable sags based on the standard deviation.

The aerial optical fiber cable inspection device according to the present invention includes a calculation circuit that receives a vibration distribution along a longitudinal direction of an aerial optical fiber cable as an input and calculates a standard deviation of an amplitude at each position in the vibration distribution and an analysis circuit that identifies a cable sagging section in which the aerial optical fiber cable sags based on the standard deviation.

The waveform of the average of vibration at each point in the vibration distribution does not exhibit differences depending on the presence or absence of a sagging, while the waveform of the standard deviation exhibits differences, enabling identification of a sagging section. Thus, the present invention can provide an aerial optical fiber cable inspection method and an aerial optical fiber cable inspection device which can identify a cable sagging section from vibration sensing results.

The specific criteria are as follows.

(1) In the analysis step, a section in which the standard deviation is larger than an average of the standard deviations at each position along the longitudinal direction of the aerial optical fiber cable is identified as the cable sagging section.

(2) In the analysis step, an arbitrary section along the longitudinal direction of the aerial optical fiber cable is identified as the cable sagging section if a variance of the standard deviations at each position included in the arbitrary section is larger than a preset threshold value.

(3) In the analysis step, a section in which the standard deviation is larger than a preset threshold value is identified as the cable sagging section.

The present invention also provides a program for causing a computer to operate as the aerial optical fiber cable inspection device. The aerial optical fiber cable inspection device according to the present invention can also be realized by a computer and a program and the program can be recorded on a recording medium or provided through a network.

The above aspects of the invention can be combined when possible.

Effects of the Invention

The present invention can provide an aerial optical fiber cable inspection method, an aerial optical fiber cable inspection device, and a program which can identify a cable sagging section from vibration sensing results.

BRIEF DESCRIPTION OF DRAWINGS

FIG. 1 is a diagram showing an aerial optical fiber cable inspection method according to the present invention.

FIG. 2 is a diagram showing the principle of the aerial optical fiber cable inspection method according to the present invention.

FIG. 3 is a diagram showing an inspection result obtained by the aerial optical fiber cable inspection method according to the present invention.

FIG. 4 is a flowchart showing an aerial optical fiber cable inspection method according to the present invention.

FIG. 5 is a diagram showing an aerial optical fiber cable inspection device according to the present invention.

DESCRIPTION OF EMBODIMENTS

Embodiments of the present invention will be described with reference to the accompanying drawings. The embodiments described below are examples of the present invention and the present invention is not limited to the following embodiments. In this specification and drawings, the same reference signs indicate the same components.

FIG. 1 shows an example of identifying a cable sagging section through optical fiber vibration sensing according to the present invention. Here, reference sign 1 represents an optical fiber vibration sensing device, 2 represents an optical fiber cable, and 3 represents an optical fiber housed in the optical fiber cable. It is shown that a sagging section of an aerial cable can be identified with the configuration of FIG. 1.

The strain of an aerial cable due to an external force is discussed in NPL 2, in which Equations (1) and (2) are stated (on p. 13 and p. 11, respectively). Equations (1) and (2) when the models of FIGS. 2(A) and 2(B) are used will be described. Upon receiving an external force, a minute section of the aerial cable is displaced from an equilibrium state. Let u be the amount of displacement in an x direction, v the amount of displacement in a y direction, and w the amount of displacement in a z direction. Assuming that the contribution of higher-order differential terms to the strain is small, the longitudinal strain ε of the cable is given by the following equation independent of the amount of displacement v.

[Formula 1]

$$\varepsilon = \frac{\partial u}{\partial x} + \frac{dw^s}{dx} \frac{\partial w}{\partial x} \quad (1)$$

Here, $w^s$ represents the sag of the cable at position x. On the other hand, the sag $w^s$ is given by the following equation.

[Formula 2]

$$w^s(x) = 4d \cdot [-(x/l)^2 + x/l], (0 \le x \le l) \quad (2)$$

Here, d represents the maximum sag. Substituting Equation (2) into Equation (1) gives the following equation.

[Formula 3]

$$\varepsilon = \varepsilon_u + 4d \cdot (-2x/l^2 + 1/l) \cdot \varepsilon_w \quad (3)$$

[Formula 4]

$$\varepsilon_u = \frac{\partial u}{\partial x}, \\ \varepsilon_w = \frac{\partial w}{\partial x} \quad (4)$$

Here, $\varepsilon_u$ and $\varepsilon_w$ represent the amounts of strain due to displacements in the x and z directions from the equilibrium state, respectively.

Considering disturbances from the natural environment, $\varepsilon_u$ and $\varepsilon_w$ are independent of each other. The time averages of $\varepsilon_u$ and $\varepsilon_w$ are zero because they represent the amounts of strain from the equilibrium state. Thus, an average $\mu_\varepsilon$ and a standard deviation $\sigma_\varepsilon$ of the strain given by Equation (3) are given by the following equations.

[Formula 5]

$$\mu_\varepsilon = 0 \quad (5)$$

[Formula 6]

$$\sigma_\varepsilon = \sqrt{\sigma_{\varepsilon_u}^2 + [4d \cdot (-2x/l^2 + 1/l)]^2 \cdot \sigma_{\varepsilon_w}^2} \quad (6)$$

Here, $\sigma_{\varepsilon_u}^2$ and $\sigma_{\varepsilon_w}^2$ represent the variances of $\varepsilon_u$ and $\varepsilon_w$, respectively.

The average does not depend on the sag d, but the standard deviation depends on the sag d, such that the cable sagging section can be identified by calculating the variance value of vibration which is a dynamic phenomenon. The standard deviation also depends on $\varepsilon_u$ and $\varepsilon_w$, but disturbances such as wind rarely change between cable spans and $\varepsilon_u$ and $\varepsilon_w$ can be regarded as substantially constant. Thus, the standard deviation $\sigma_\varepsilon$ of the strain applied to the cable depends on the sag d and the cable sagging section can be identified by comparing the strains of cable spans, that is, the standard deviations of vibration thereof.

FIG. 5 is a functional block diagram of the optical fiber vibration sensing device 1 shown in FIG. 1. The optical fiber vibration sensing device 1 includes an optical fiber reflection measurement unit 11, a data storage unit 12, and a standard deviation analysis unit 13. The optical fiber reflection measurement unit 11 receives backscattered light of test light incident on an optical fiber cable to be measured and acquires a vibration distribution along the longitudinal direction of the aerial optical fiber cable. The optical fiber reflection measurement unit 11 is, for example, an optical time domain reflectometer (OTDR). The data storage unit 12 stores the vibration distribution.

The standard deviation analysis unit 13 corresponds to the aerial optical fiber cable inspection device of the present invention. The standard deviation analysis unit 13 includes a calculation circuit 13a that receives a vibration distribution along a longitudinal direction of an aerial optical fiber cable from the data storage unit 12 as an input and calculates a standard deviation of the amplitude at each position in the vibration distribution and an analysis circuit 13b that identifies a cable sagging section in which the aerial optical fiber cable sags based on the standard deviation.

FIG. 4 is a diagram showing a method of aerial optical fiber cable inspection performed by the optical fiber vibration sensing device 1. That is, the optical fiber reflection measurement unit 11 in the optical fiber vibration sensing device 1 performs an acquisition step S01 of acquiring a vibration distribution along a longitudinal direction of an aerial optical fiber cable and the standard deviation analysis unit 13 performs a calculation step S02 of calculating a standard deviation of an amplitude at each position in the vibration distribution and an analysis step S03 of identifying a cable sagging section in which the aerial optical fiber cable sags based on the standard deviation.

That is, in the acquisition step S01, optical fiber vibration sensing is performed. In the calculation step S02, the standard deviation of the amplitude is calculated for a vibration waveform of each section in the longitudinal direction of the optical fiber cable. In the analysis step S03, a section in which the standard deviation of the amplitude is larger than the standard deviation of other sections is identified as a cable sagging section.

FIG. 3 is a diagram showing a vibration distribution (A) of an aerial cable measured by the optical fiber reflection measurement unit 11 and an average (B) and a standard deviation (C) calculated from the vibration distribution by the calculation circuit 13a of the standard deviation analysis unit 13. The waveform of the average of vibration does not exhibit differences depending on the presence or absence of a sagging, while the waveform of the standard deviation exhibits differences, enabling identification of a sagging section.

Here, a specific method for identifying a sagging section performed by the analysis circuit 13b will be described.

(Identification Method 1) The standard deviation of vibration at each point is averaged and a portion whose standard deviation is larger than the average is defined as a sagging section. That is, in the analysis step S03, a section in which the standard deviation is larger than an average of the standard deviations at each position along the longitudinal direction of the aerial optical fiber cable is identified as the cable sagging section.

(Identification Method 2) A portion in which the standard deviations of vibration at each point vary greatly is identified as a sagging section. That is, in the analysis step S03, an arbitrary section along the longitudinal direction of the aerial optical fiber cable is identified as the cable sagging section if a variance of the standard deviations at each position included in the arbitrary section is larger than a preset threshold value. For example, in the case of FIG. 3, a section having a distance of 1962 to 2035 m has a greater variation in standard deviation than a section having a distance of 2035 to 2100 m and is thus identified as a sagging section.

(Identification Method 3) A threshold value is set for the standard deviation and a portion whose standard deviation is larger than the threshold value is identified as a sagging section. That is, in the analysis step S03, a section in which the standard deviation is larger than the preset threshold value is identified as the cable sagging section.

Effects of the Invention

The method for identifying a sagging section of an aerial optical fiber cable according to the present invention has the following advantages over the related art 1. In the related art 1, the relationship between the cable sagging and the optical fiber vibration sensing results is not clarified and a physical quantity to be measured for identifying the cable sagging is unknown. In the present invention, a cable sagging section can be identified based on an increase in the standard deviation of the vibration of the optical fiber due to a cable sagging.

REFERENCE SIGNS LIST

1 Optical fiber vibration sensing device
2 Optical fiber cable
3 Optical fiber
11 Optical fiber reflection measurement unit
12 Data storage unit
13 Standard deviation analysis unit
13a Calculation circuit
13b Analysis circuit

The invention claimed is:

1. An aerial optical fiber cable inspection method comprising:
   acquiring a vibration distribution along a longitudinal direction of an aerial optical fiber cable;
   calculating a standard deviation of an amplitude at each position in the vibration distribution; and
   identifying a cable sagging section in which the aerial optical fiber cable sags based on the standard deviation.

2. The aerial optical fiber cable inspection method according to claim 1, wherein a section in which the standard deviation is larger than an average of the standard deviations at each position along the longitudinal direction of the aerial optical fiber cable is identified as the cable sagging section.

3. The aerial optical fiber cable inspection method according to claim 1, wherein an arbitrary section along the longitudinal direction of the aerial optical fiber cable is identified as the cable sagging section if a variance of the standard deviations at each position included in the arbitrary section is larger than a preset threshold value.

4. The aerial optical fiber cable inspection method according to claim 1, wherein a section in which the standard deviation is larger than a preset threshold value is identified as the cable sagging section.

5. An aerial optical fiber cable inspection device comprising:
   a calculation circuit that receives a vibration distribution along a longitudinal direction of an aerial optical fiber cable as an input and calculates a standard deviation of an amplitude at each position in the vibration distribution; and
   an analysis circuit that identifies a cable sagging section in which the aerial optical fiber cable sags based on the standard deviation.

6. A non-transitory computer-readable storage medium storing a program for causing a computer to operate as the aerial optical fiber cable inspection device according to claim 5.

* * * * *